(12) United States Patent
Block et al.

(10) Patent No.: US 10,628,749 B2
(45) Date of Patent: Apr. 21, 2020

(54) AUTOMATICALLY ASSESSING QUESTION ANSWERING SYSTEM PERFORMANCE ACROSS POSSIBLE CONFIDENCE VALUES

(71) Applicant: International Business Machines Corporation, Armonk, NY (US)

(72) Inventors: Alexander M. Block, New York, NY (US); Anna M. Chaney, Austin, TX (US); Stefan A. Van Der Stockt, Johannesburg (ZA); Kai G. H. Young, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 1090 days.

(21) Appl. No.: 14/943,703

(22) Filed: Nov. 17, 2015

(65) Prior Publication Data

US 2017/0140289 A1    May 18, 2017

(51) Int. Cl.
  *G06N 5/04*  (2006.01)
  *G06N 20/00* (2019.01)
(52) U.S. Cl.
  CPC .............. *G06N 5/048* (2013.01); *G06N 20/00* (2019.01)
(58) Field of Classification Search
  CPC .......... G06N 5/04; G06N 5/02; G06N 99/005; G09B 7/04; G06F 9/4446
  (Continued)

(56) References Cited

U.S. PATENT DOCUMENTS 7,346,491 B2  3/2008  Kanagasabai et al.
8,239,203 B2  8/2012  Stubley et al.
(Continued)

FOREIGN PATENT DOCUMENTS

CN   101079026 A   11/2007
CN   103164394 A    6/2013
WO   WO00/79426 A1  12/2013

OTHER PUBLICATIONS

McQuiggan et al.—"Modeling self-efficacy in intelligent tutoring systems: An inductive approach"—2007—https://rd.springer.com/article/10.1007/s11257-007-9040-y (Year: 2007).*

(Continued)

*Primary Examiner* — Eric Nilsson
*Assistant Examiner* — Viker A Lamardo
(74) *Attorney, Agent, or Firm* — Stephen R Tkacs; Stephen J. Walder, Jr.; Diana R. Gerhardt

(57) ABSTRACT

A mechanism is provided in a data processing system for assessing question answering system performance. The mechanism receives question answering system results. The question answering system results comprise questions posed to the question answering system, answers returned by the question answering system for each question posed to the question answering system, and a confidence value for each answer. The question answering system is trained or tested using the ground truth questions and answers. The mechanism performs a matching operation comparing each question in the question answering system results to questions in the ground truth. A given question is determined to be on-topic or off-topic based on results of the matching operation. For a plurality of confidence threshold values, the mechanism determines a rightness or wrongness of each answer in the question answering system results. The mechanism generates performance statistics for the plurality of confidence threshold values based on whether each question is on-topic or off-topic and whether each answer is right or wrong. The mechanism presents the performance statistics to the user via a user interface.

21 Claims, 9 Drawing Sheets

(58) Field of Classification Search
USPC .......................................................... 706/11
See application file for complete search history.

(56) References Cited

U.S. PATENT DOCUMENTS

| | | | |
|---|---|---|---|
| 8,332,394 B2 | 12/2012 | Fan et al. | |
| 8,346,548 B2 | 1/2013 | Owen | |
| 8,601,030 B2 | 12/2013 | Bagchi et al. | |
| 8,863,233 B2 | 10/2014 | Yamahara | |
| 8,959,043 B2 | 2/2015 | Ferrucci et al. | |
| 9,047,567 B2 | 6/2015 | Barborak et al. | |
| 9,053,425 B2 | 6/2015 | Barborak et al. | |
| 9,092,988 B2 | 7/2015 | Agarwal et al. | |
| 9,092,989 B2 | 7/2015 | Agarwal et al. | |
| 9,165,252 B2 | 10/2015 | Barborak et al. | |
| 2008/0270742 A1 | 10/2008 | Huang et al. | |
| 2009/0287678 A1 | 11/2009 | Brown et al. | |
| 2010/0318642 A1* | 12/2010 | Dozier | H04L 12/66 709/223 |
| 2011/0066587 A1 | 3/2011 | Ferrucci et al. | |
| 2011/0125734 A1 | 5/2011 | Duboue et al. | |
| 2013/0007055 A1 | 1/2013 | Brown et al. | |
| 2013/0017523 A1 | 1/2013 | Barborak et al. | |
| 2013/0018652 A1 | 1/2013 | Ferrucci et al. | |
| 2013/0024457 A1* | 1/2013 | Chua | G06F 17/3061 707/740 |
| 2013/0066886 A1 | 3/2013 | Bagchi et al. | |
| 2013/0138428 A1 | 5/2013 | Chandramouli et al. | |
| 2013/0138439 A1 | 5/2013 | Marcus et al. | |
| 2013/0212111 A1* | 8/2013 | Chashchin | G06F 17/30707 707/740 |
| 2014/0141399 A1 | 5/2014 | Agarwal et al. | |
| 2014/0141401 A1 | 5/2014 | Agarwal et al. | |
| 2014/0272909 A1 | 9/2014 | Isensee et al. | |
| 2014/0278754 A1* | 9/2014 | Cronin | G06F 17/30539 705/7.29 |
| 2014/0280087 A1 | 9/2014 | Isensee et al. | |
| 2015/0169339 A1 | 6/2015 | Anderson et al. | |
| 2015/0186784 A1 | 7/2015 | Barborak et al. | |
| 2015/0310755 A1* | 10/2015 | Haverlock | G09B 7/02 434/350 |
| 2016/0299975 A1 | 10/2016 | Acar et al. | |
| 2017/0140259 A1 | 5/2017 | Block et al. | |
| 2017/0140290 A1* | 5/2017 | Block | G06N 99/005 |
| 2017/0185904 A1* | 6/2017 | Padmanabhan | G06N 5/04 |
| 2017/0249554 A1* | 8/2017 | Zirnstein | G06N 5/04 |

OTHER PUBLICATIONS

"The Area Under an ROC Curve"—2001—https://web.archive.org/web/20010306083840/http://gim.unmc.edu/dxtests/roc3.htnn (Year:2001).*

"The magnificent ROC"—2011—http://www.anaesthetist.com/mnm/stats/roc/Findex.htm (Year: 2011).*

Jousse, Florent et al., "Learning to Extract Answers in Question Answering: Experimental Studies", Grappa Lab Lille 3 University and Inria Futurs, Lille, Mostrare Project, Coria 2005, pp. 1-15.

Jurafsky, Daniel t al., "Chapter 28: Question Answering", Speech and Language Processing: Draft of Aug. 7, 2017, 19 pages.

Ravichandran, Deepak et al., Learning Surface Text Patterns for a Question Answering System, ACM Digital Library, USC, Proceeding ACL '02 Proceedings of the 40th Annual Meeting on Association for Computational linguistics, Philadelphia, Penn, Jul. 7-12, 2002, pp. 41-47.

Unger, Christina et al., "Template-based question answering over RDF data", ACM (DL) Digital Library, Proceeding WWW '12 Proceedings of the 21st International Conference on the World Wide Web, Lyon France, Apr. 16-20, 2012, ACM New York, NY, pp. 639-648.

List of IBM Patents or Patent Applications Treated as Related (Appendix P), 2 pages.

"System and Method to Identify Increases and Decreases in Accuracy After Ingestion", IP.com No. 000235693, IP.com Electronic Publication: Mar. 20, 2014, 3 pages.

Cao. Richard et al., "Nonparametric Estimation of Conditional ROC Curves: Application to Discrimination Tasks in Computerized Detection of Early Breast cancer", Journal of Computational Statistics & Data Analysis, vol. 52 Issue 5, Jan. 2008, 13 pages.

Ferri-Ramirez, C. et al., "Multi-dimensional ROC Analysis with Decision Trees", http://users.dsic.upv.esi~flip/papers/Cost-ROC-Multidimensiona7.pdf, Technical Report Jan. 17, 2002, 36 pages.

High, Rob, "The Era of Cognitive Systems: An Inside Look at IBM Watson and How it Works", IBM Corporation, Redbooks, Dec. 12, 2012, 16 pages.

Lyon, Caroline et al., "Detecting Short Passages of Similar Text in Large Document Collections", Proceedings of the 2001 Conference on Empirical Methods in Natural Language Processing, Jun. 3-4, 2001, 8 pages.

McCord, M.C, et al,, "Deep parsing in Watson", IBM J. Res, & Dev. vol. 56 No. 314 Paper 3, May/Jul. 2012, pp. 3:1-3:15.

Yuan, Michael J. , "Watson and healthcare, How natural language processing and semantic search could revolutionize clinical decision support", IBM developerWorks, IBM Corporation, Apr. 12, 2011, 14 pages.

Carr, Amelia S. et al., ""Strategically managed buyer-supplier relationships and performance outcomes"", ScienceDirect Elsevier Journal of Operations Management, vol. 17, Issue 5, Aug. 1999, pp. 497-519.

Chenhall, Robert H., "Integrative strategic performance measurement systems, strategic alignment of manufacturing, learning and strategic outcomes: an exploratory study", ScienceDirect Elsevier Accounting, Organizations and Society, vol. 30, Issue 5, Jul. 2005, pp. 395-422.

Djurdjanovic, Dragan et al., ""Watchdog Agent—an infotronics-based approach for product performance degradation assessment and prediction"", ScienceDirect Elsevier Advanced Engineering Informatics, vol. 17, Issue 3-4, Jul.-Oct. 2003, pp. 109-125.

Ittner, Christopher D. et al., "Performance implications of strategic performance measurement in financial services firms", ScienceDirect Elsevier Accounting, Organizations and ?Society, vol. 28, Issues 7-8, Oct./Nov. 2003, pp. 715-741.

* cited by examiner

| BOOLEAN FUNCTION | RIGHT (t) | WRONG (t) |
|---|---|---|
| ON-TOPIC QUESTION VS. CORRECT ANSWER CONFIDENCE $t_0$ | $t_0 \geq t$ | $t_0 < t$ |
| ON-TOPIC QUESTION VS. INCORRECT ANSWER | 0 | 1 |
| OFF-TOPIC QUESTION ANSWER CONFIDENCE $t_0$ | $t_0 < t$ | $t_0 \geq t$ |

AUTOMATICALLY ASSESSING QUESTION ANSWERING SYSTEM PERFORMANCE ACROSS POSSIBLE CONFIDENCE VALUES

BACKGROUND

The present application relates generally to an improved data processing apparatus and method and more specifically to mechanisms for automatically assessing question answering system performance across possible confidence values.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana® from Microsoft®, and the IBM Watson™ system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for assessing question answering system performance. The method comprises receiving, by the data processing system, question answering system results. The question answering system results comprise questions posed to the question answering system, answers returned by the question answering system for each question posed to the question answering system, and a confidence value for each answer. The question answering system is trained or tested using the ground truth questions and answers. The method further comprises performing, by the data processing system, a matching operation comparing each question in the question answering system results to questions in the ground truth. A given question is determined to be on-topic or off-topic based on results of the matching operation. The method further comprises determining, by the data processing system, a rightness or wrongness of each answer in the question answering system results for a plurality of confidence threshold values. The method further comprises generating, by the data processing system, performance statistics for the plurality of confidence threshold values based on whether each question is on-topic or off-topic and whether each answer is right or wrong. The method further comprises presenting, by the data processing system, the performance statistics to the user via a user interface.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
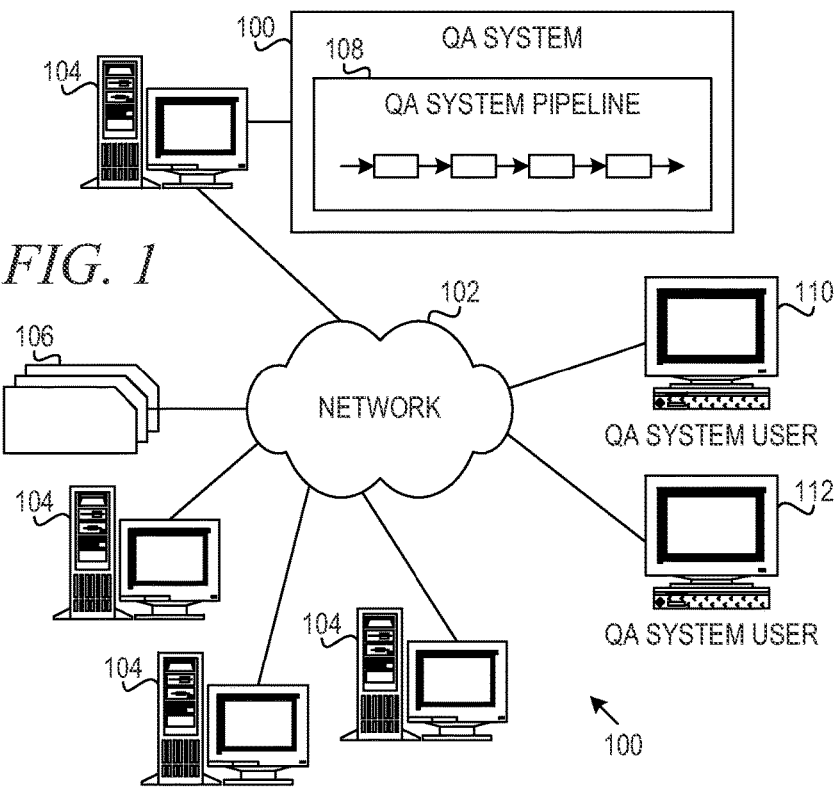
FIG. 1 depicts a schematic diagram of one illustrative embodiment of a question/answer creation (QA) system in a computer network.

Current performance measures for question answering systems are insufficient for client usage due to the deeply technical nature of measures used. The measures used are mostly Natural Language Processing (NLP) and Artificial Intelligence (AI) specific. Clients want to understand the behavioral consequences and trade-off of their deployed systems, not just to see training statistics or performance at a single parameter point. Implementers struggle to measure performance against usage data from deployed question answering systems versus only using the ground truth data because of the manual nature of testing.

Question answering systems like IBM Watson™ Engagement Advisor behave differently depending on the confidence threshold that implementation teams select. A confidence threshold that is set too high results in the system never answering questions, while a threshold that is set too low results in the system often answering questions, whether the answer is right or wrong. Additionally, the confidence threshold value has a complex interaction with a ground truth field called "IS_ON_TOPIC," which stipulates whether a question should be answered (i.e., considered to be on topic) or not attempted at all (off topic). Ideally, the question answering system should never answer off-topic questions, while only answering on-topic questions that are above the confidence threshold.

The illustrative embodiments provide mechanisms for automatically assessing question answering system performance across all possible confidence thresholds. The illustrative embodiments assist in determining what the confidence threshold be set to for a specific customer use case to maximize on-topic correctness answers and minimize off-topic answers. The mechanisms provide tools and methodologies for implementation teams to assess the overall balance and trade-off between the possible threshold parameter settings versus the context of on-versus off-topic questions. The mechanisms allow users to automatically assess all possible parameter settings, investigate the trade-off, and select the best behavior as preferred by the customer.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
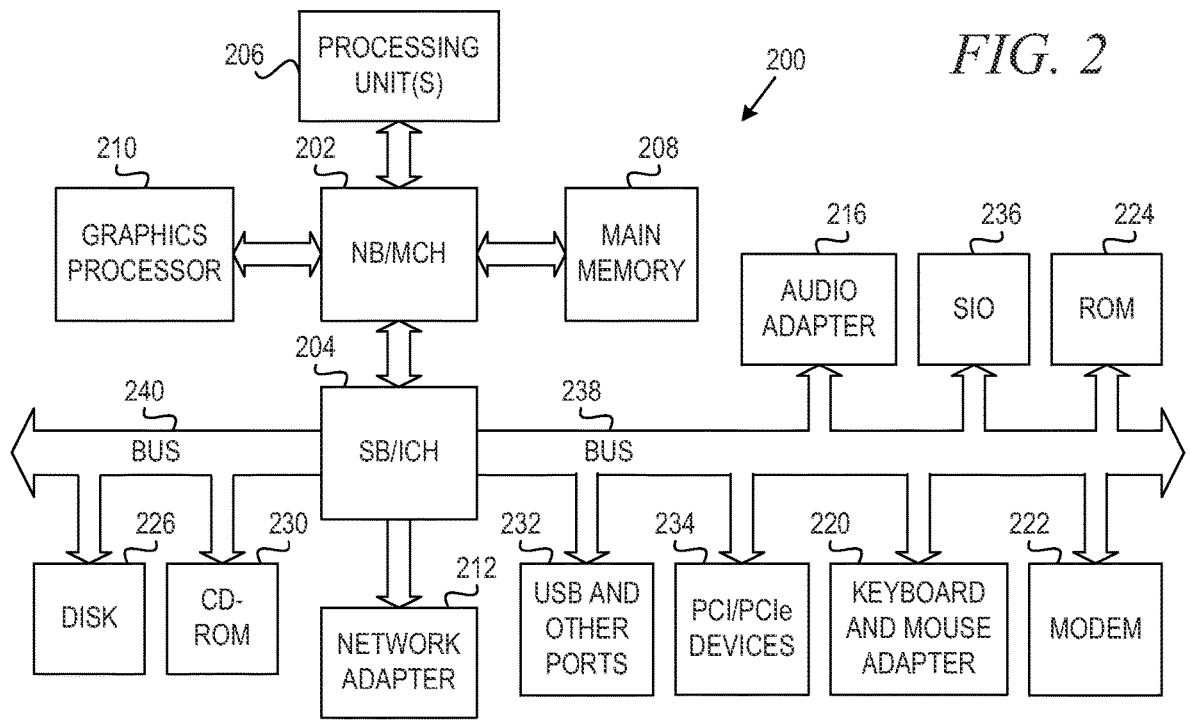
FIG. 2 is a block diagram of an example data processing system in which aspects of the illustrative embodiments are implemented.
Figure 3:
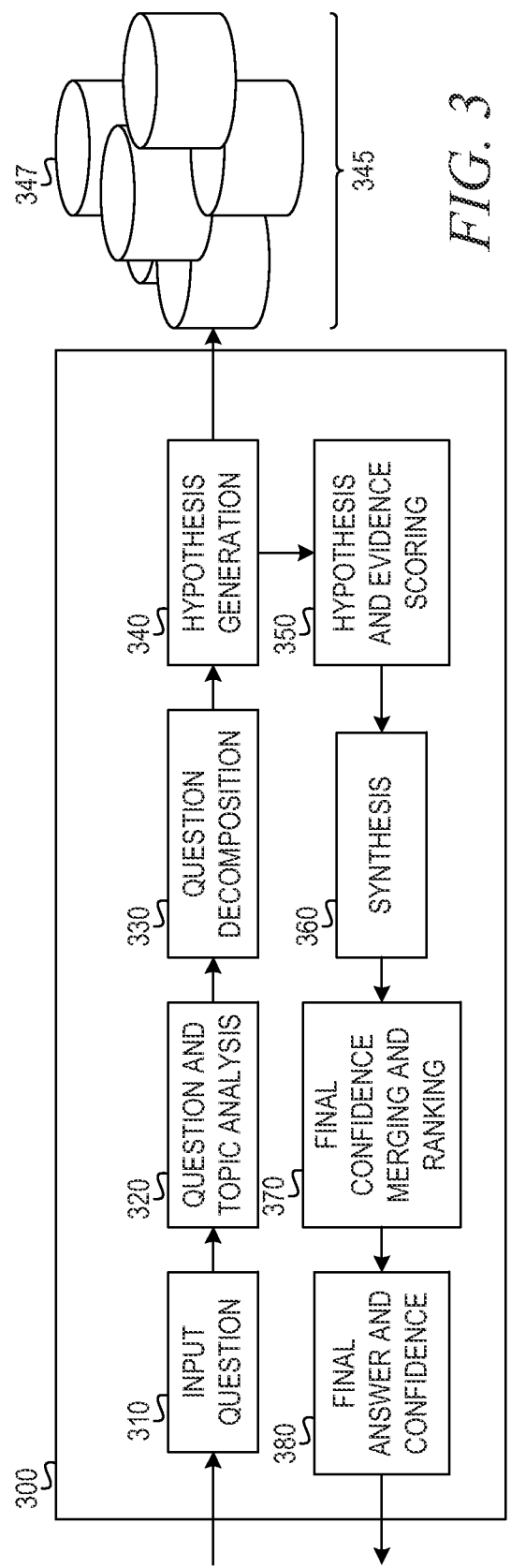
FIG. 3 illustrates a QA system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example Question Answering (QA) system (also referred to as a Question/Answer system or Question and Answer system), methodology, and computer program product with which the mechanisms of the illustrative embodiments are implemented. As will be discussed in greater detail hereafter, the illustrative embodiments are integrated in, augment, and extend the functionality of these QA mechanisms with regard to automatically assessing system performance across confidence thresholds and automated similarity comparison of model answers versus output answers.

Thus, it is important to first have an understanding of how question and answer creation in a QA system is implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments are implemented. Many modifications to the example QA system shown in FIGS. 1-3 may be implemented in various embodiments of the present invention without departing from the spirit and scope of the present invention.

As an overview, a Question Answering system (QA system) is an artificial intelligence application executing on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to the QA system which then answers the input questions using the content in the corpus of data by evaluating documents, sections of documents, portions of data in the corpus, or the like. When a process evaluates a given section of a document for semantic content, the process can use a variety of conventions to query such document from the QA system, e.g., sending the query to the QA system as a well-formed question which are then interpreted by the QA system and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA system receives an input question, parses the question to extract the major features of the question, uses the extracted features to formulate queries, and then applies those queries to the corpus of data. Based on the application of the queries to the corpus of data, the QA system generates a set of hypotheses, or candidate answers to the input question, by looking across the corpus of data for portions of the corpus of data that have some potential for containing a valuable response to the input question. The QA system then performs deep analysis, e.g., English Slot Grammar (ESG) and Predicate Argument Structure (PAS) builder, on the language of the input question and the language used in each of the portions of the corpus of data found during the application of the queries using a variety of reasoning algorithms (see, for example, McCord et al., "Deep Parsing in Watson," IBM J. Res. & Dev., vol. 56, no. 3/4, May/July 2012 for more information on deep analysis in IBM Watson™). There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA system. The statistical model is used to summarize a level of confidence that the QA system has regarding the evidence that the potential response, i.e. candidate answer, is inferred by the question. This process is repeated for each of the candidate answers until the QA system identifies candidate answers that surface as being significantly stronger than others and thus, generates a final answer, or ranked set of answers, for the input question.

As mentioned above, QA systems and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information useable by the QA system to identify the question and answer attributes of the content.

Operating on such content, the QA system generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The QA system 100 and network 102 enables question/answer (QA) generation functionality for one or more QA system users via their respective computing devices 110-112. Other embodiments of the QA system 100 may be used with components, systems, sub-systems, and/or devices other than those that are depicted herein.

The QA system 100 is configured to implement a QA system pipeline 108 that receive inputs from various sources. For example, the QA system 100 receives input from the network 102, a corpus of electronic documents 106, QA system users, and/or other data and other possible sources of input. In one embodiment, some or all of the inputs to the QA system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document includes any file, text, article, or source of data for use in the QA system 100. QA system users access the QA system 100 via a network connection or an Internet connection to the network 102, and input questions to the QA system 100 that are answered by the content in the corpus of data 106. In one embodiment, the questions are formed using natural language. The QA system 100 parses and interprets the question, and provides a response to the QA system user, e.g., QA system user 110, containing one or more answers to the question. In some embodiments, the QA system 100 provides a response to users in a ranked list of candidate answers while in other illustrative embodiments, the QA system 100 provides a single final answer or a combination of a final answer and ranked listing of other candidate answers.

The QA system 100 implements a QA system pipeline 108 which comprises a plurality of stages for processing an input question and the corpus of data 106. The QA system pipeline 108 generates answers for the input question based on the processing of the input question and the corpus of data 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. As outlined previously, the IBM Watson™ QA system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The IBM Watson™ QA system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the IBM Watson™ QA system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In accordance with an illustrative embodiment, mechanisms are provided for automatically assessing QA system performance across possible confidence thresholds and for similarity comparison of model answers versus output answers. The mechanisms may exist within QA system 100, on the same data processing system such as server 104, or on a different data processing system such as a different server 104 or a QA system user data processing system 110, 112. A mechanism for assessing QA system performance compares results of QA system 100 with ground truth questions and answers to determine accuracy using a range of confidence threshold values. In one embodiment, the mechanism uses a combination of receiver operating characteristics (ROC) curves blended together with on-versus off-topic information for each question in the ground truth to create a hybrid ROC-like curve to visualize the performance of QA system 100 at all possible confidence threshold values. The mechanism presents the ROC-like hybrid curve to the user via a user interface that allows the threshold to take both natural language processing question answering performance and on-versus off-topic information into account. In an example embodiment, the mechanism presents a similar correctness curve that also uses the on-versus off-topic information.

In another illustrative embodiment, a mechanism for automated similarity comparison of model answers versus output answers posts each ground truth question to the QA system 100 and records the resulting answer. The mechanism compares each answer with the ground truth model answer and presents summary statistics to the user. The mechanism uses a fuzzy matching algorithm to find the degree of overlap between the system answer and the ground truth answer.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA system pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user inputs, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?.," the LAT is the string "maneuver." The focus of a question is the part of the question that, if replaced by the answer, makes the question a standalone statement. For example, in the question "What drug has been shown to relieve the symptoms of ADD with relatively few side effects?" the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

The majority of efforts on current question answering system deployments is spent on iteratively training the system on customer data and assessing performance. This is especially true for IBM Watson™ Engagement Advisor (WEA), which involves manual curation of thousands of representative questions and answers into a "ground truth," manual training of WEA machine learning models on this ground truth data, and manual testing the performance against customer objectives. Practitioners only perform spot tests using a subset of confidence threshold settings. Practitioners typically manually ask WEA a subset of questions and intuitively gauge what they think the threshold should be set to using rules of thumb and manual spot tests.

Figure 4:
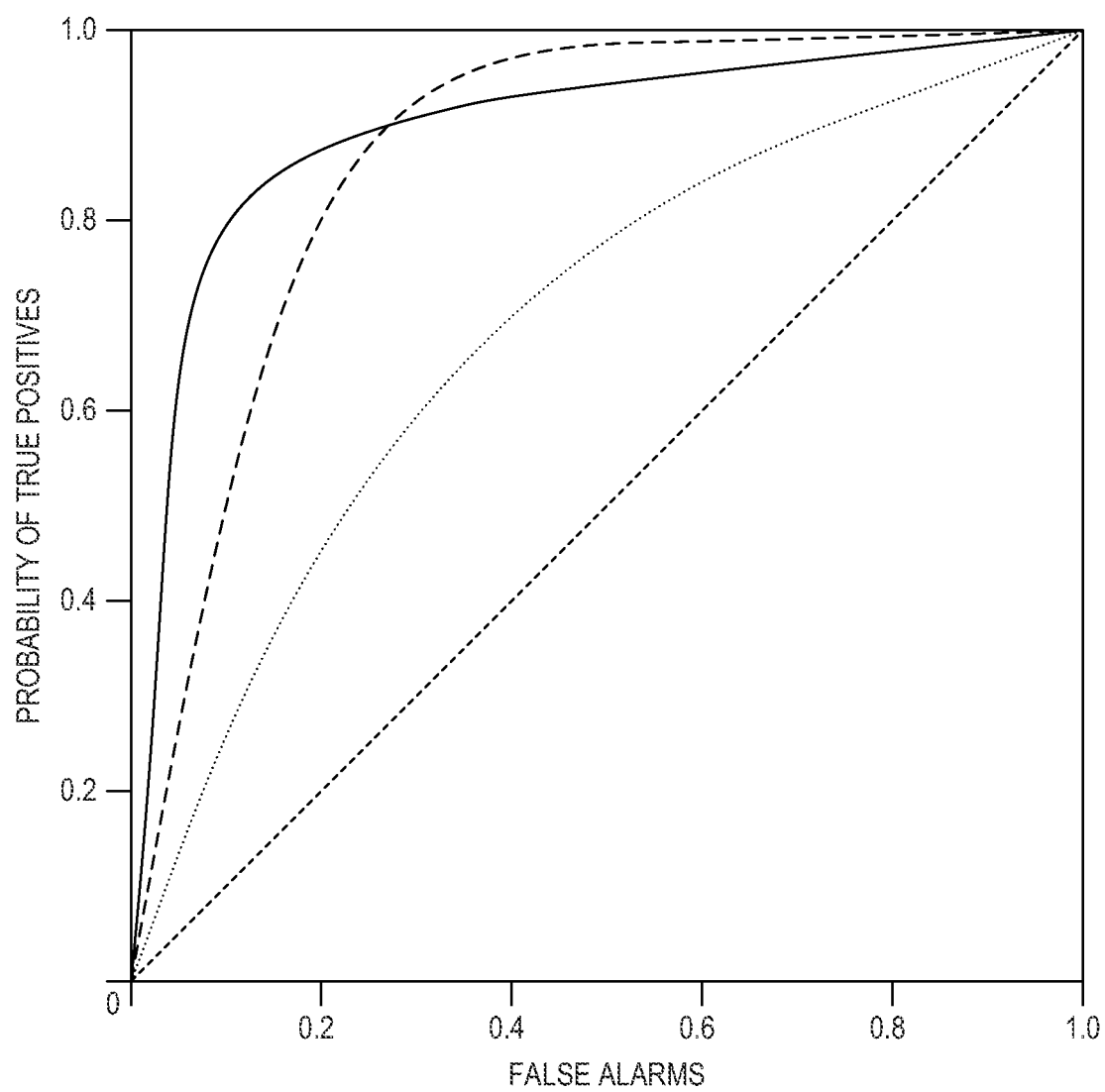
FIG. 4 illustrates an example of a binary decision ROC curve in accordance with an illustrative embodiment.

FIG. 4 illustrates an example of a binary decision ROC curve in accordance with an illustrative embodiment. The field of remote sensing has long used Receiver Operating Characteristics (ROC) curves to visually characterize the probability of detecting a target at a given sensor threshold. ROC curves have become standard practice in other fields such as medicine to optimize the trade-off between false alarms and true positives. The x-axis of an ROC curve plots the probability of false positives (FP) (lower is better), while the y-axis plots the probability of true positives (TP) (higher is better). Thus, the top left corner of an ROC curve is the best possible performance for a system that makes zero classification errors. The diagonal line represents the performance of a purely random algorithm.

Figure 5:
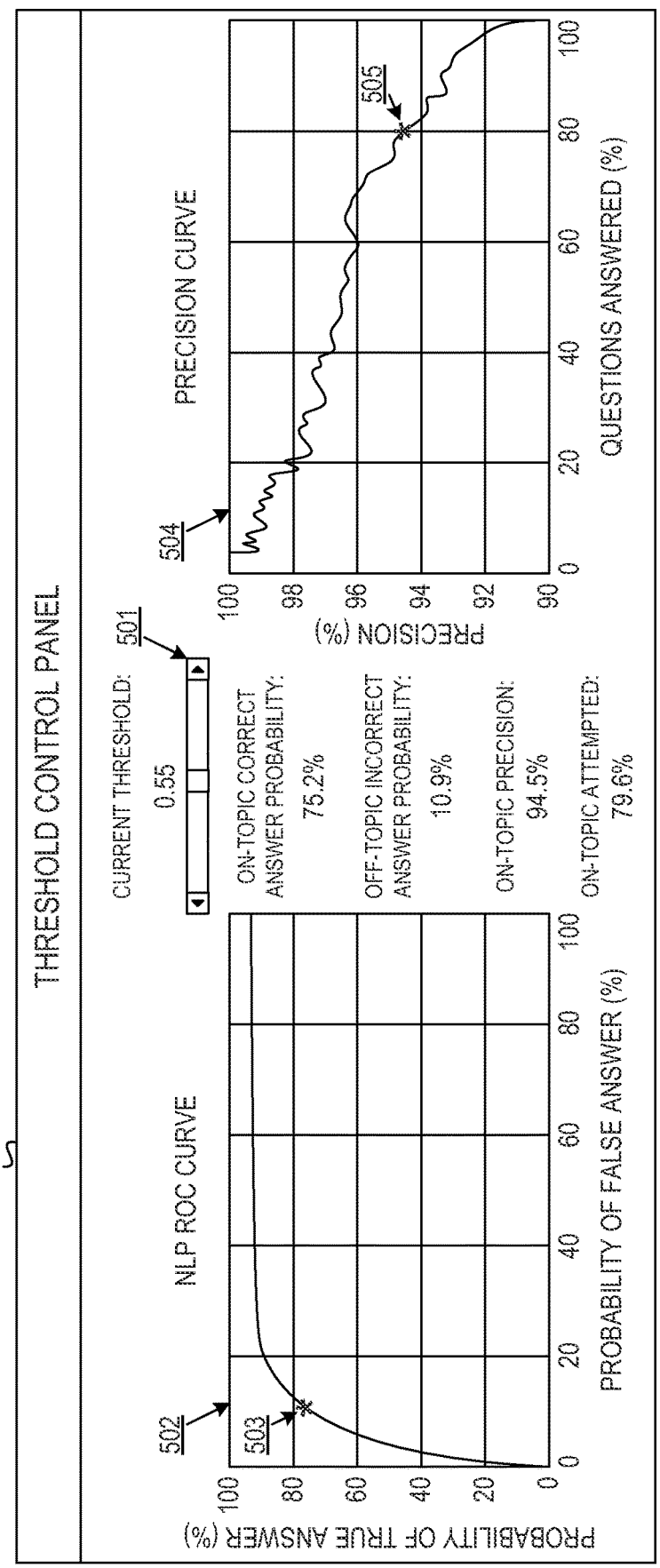
FIG. 5 depicts an interface for illustrating question answering system performance across confidence threshold values in accordance with an illustrative embodiment.

FIG. 5 depicts an interface for illustrating question answering system performance across confidence threshold values in accordance with an illustrative embodiment. The illustrative embodiments use an ROC curve approach that incorporates on- and off-topic information. Threshold control panel 500 presents Natural Language Processing (NLP) ROC curve 502 and precision curve 504. NLP ROC curve 502 plots the probability of true answer versus the probability of a false answer over all possible confidence threshold values, which range from zero to one. For a threshold of one, the QA system will answer no questions or very few questions; therefore, the probability of true answer and the probability of false answer are both zero. For a threshold of zero, the QA system will answer every question and is likely to return both correct and incorrect answers.

Precision curve 504 plots precision versus the percentage of questions answered. For a threshold of one, the QA system will only answer questions for which the confidence in the answer is 100%. For a threshold of zero, the QA system will answer all questions, which results in a lower precision.

Threshold selection control 501 allows the user to select a confidence threshold value, in this case 0.55, using a slider user interface control, for example. As the user changes the current threshold using control 501, threshold control panel interface 500 moves current threshold indicators 503 and 505 along NLP ROC curve 502 and precision curve 504, respectively. In the depicted example, the current threshold of 0.55 set on control 501 corresponds to indicator 503 on NLP ROC curve 502 and indicator 505 on precision curve 504. Threshold control panel 500 also presents on-topic correct answer probability (75.2%), off-topic incorrect answer probability (10.9%), on-topic precision (94.5%), and on-topic attempted (79.6%) statistics for the selected confidence threshold. Thus, the user can see the QA system performance statistics for any selected confidence threshold and across all possible thresholds.

Figures 6, 7:
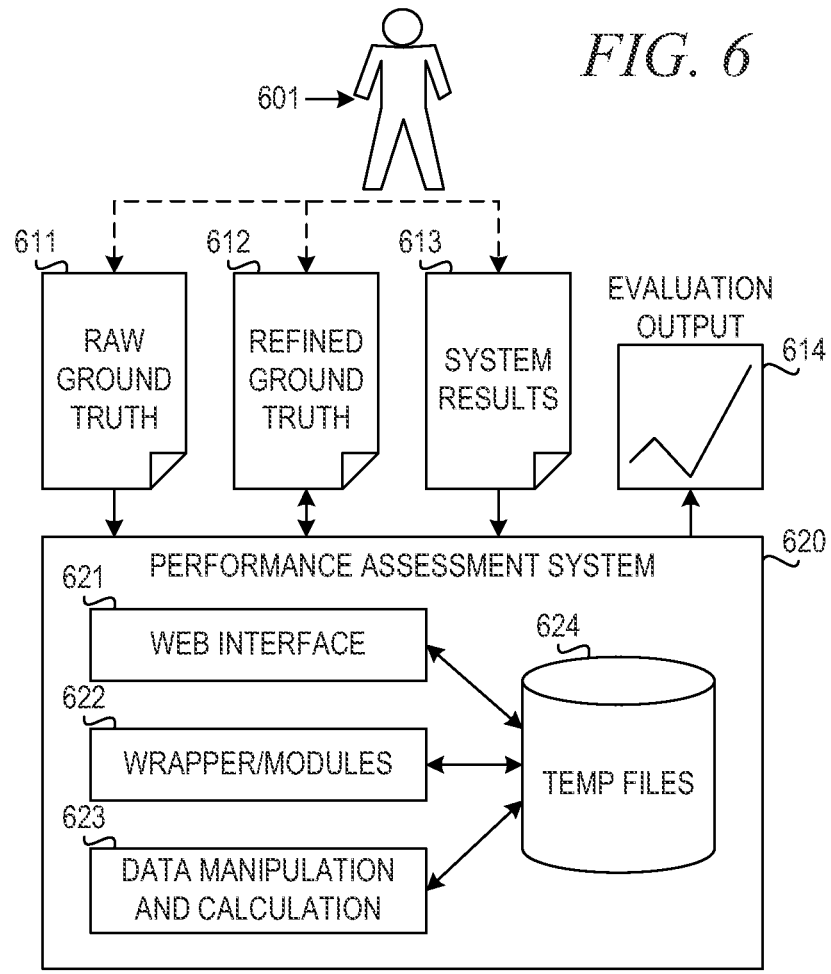
FIG. 6 is a block diagram of a system for automatically assessing question answering system performance in accordance with an illustrative embodiment.
FIG. 7 illustrates a Boolean function for an ROC hybrid curve taking into account on-topic versus off-topic information in accordance with an illustrative embodiment.

FIG. 6 is a block diagram of a system for automatically assessing question answering system performance in accordance with an illustrative embodiment. The system 600 includes a web interface component 621, a wrapper/modules component 622, and a data manipulation and calculation component 623. The components 621-623 read and write to temporary files storage 624. A user 601 provides raw ground truth to server 620, generates refined ground truth 612, and provides system results 613 from the QA system. System 620 provides evaluation output 614.

Data manipulation and calculation component 623 analyzes system results 613 based on raw ground truth 612 and/or refined ground truth 612 and collects performance statistics concerning on-topic questions answered, off-topic questions answered, correct answers, and incorrect answers based on a range of confidence threshold values. In one example embodiment, data manipulation and calculation component 623 is written in the R programming language or another programming language for computational statistics and analytics.

Wrapper/modules component 622 provides command line user interface wrappers and modules for accessing data manipulation and calculation component 623. In one example embodiment, wrapper/modules component 622 is written in Python programming language and provides a Python Command Line Interface (CLI) Application Programming Interface (API).

Web interface component 621 provides an API for accessing data manipulation and calculation component 623 through wrapper/modules component 622. In one example embodiment, web interface component 621 is a RESTful API. Representational State Transfer (REST) is the underlying architectural principle of the web. An API that adheres to the principles of REST does not require the client to know anything about the structure of the API. Rather, the server needs to provide whatever information the client needs to interact with the service.

As mentioned above, a user 601 provides raw ground truth 611 and system results 613 to server 620 and generates refined ground truth 612. In one embodiment, system 600 communicates with the QA system to automatically obtain raw ground truth 611, refined ground truth 612, and system results 613. For example, system 600 may access system results 613 though a log API of the QA system. In one embodiment, system 600 may access the QA system to automatically send questions and receive answers and confidence to compile results for assessing performance.

Performance assessment system 600 receives logs of results in which answers have an associated confidence value. Performance assessment system 600 compares those associated confidence values to a range of confidence threshold values, such as all confidence threshold values. For example, performance assessment system 600 may begin with a confidence threshold of 0.00 and increment the threshold by 0.01 until reaching a confidence threshold of 1.00. Thus, performance assessment system 600 determines performance statistics across all confidence threshold values. Performance assessment system 600 then generates evaluation output 614 and presents the output to the user 601. Performance assessment system 600 presents evaluation output 614 through web interface 621. Evaluation output 614 may include the threshold control panel display interface depicted in FIG. 5.

In accordance with an illustrative embodiment, the performance assessment system merges classic ROC information (correct versus incorrect) together with on-versus off-topic at a given threshold, t. FIG. 7 illustrates a Boolean function for an ROC hybrid curve taking into account on-topic versus off-topic information in accordance with an illustrative embodiment. For an on-topic question with a correct answer, having a confidence of $t_0$, the answer is considered right if $t_0$ is greater than or equal to the selected threshold, t, and wrong if $t_0$ is less than t. For an on-topic question with an incorrect answer, the answer is considered wrong. For an off-topic question with any answer, the answer is considered right if the confidence $t_0$ is less than t and wrong if $t_0$ is greater than or equal to t. The threshold is a confidence selected by the system administrator, and can be adjusted based on the desired outcome of user experience.

Figure 8:
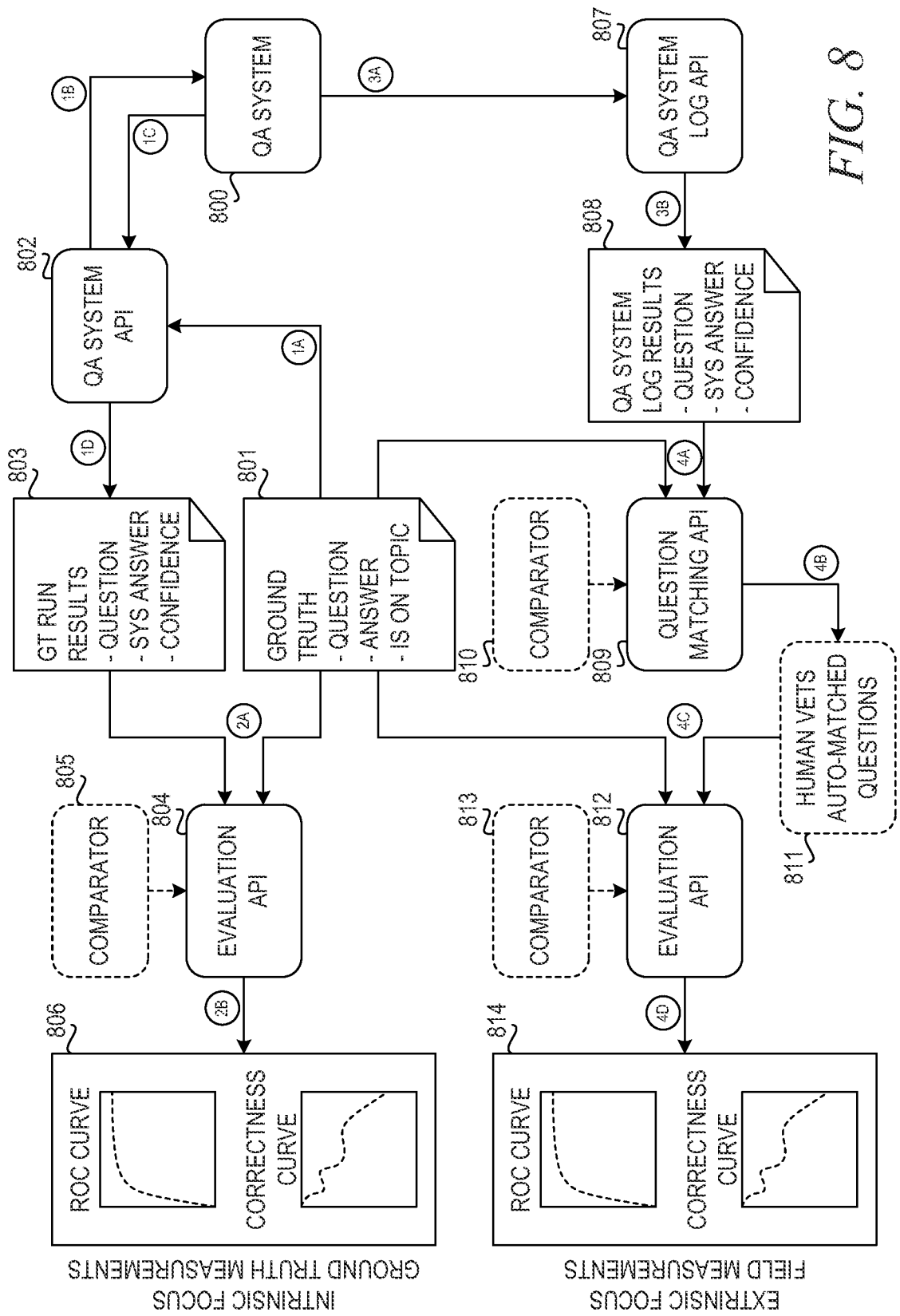
FIG. 8 depicts a usage flow for assessing question answering system performance across confidence thresholds in accordance with an illustrative embodiment.

FIG. 8 depicts a usage flow for assessing question answering system performance across confidence thresholds in accordance with an illustrative embodiment. Question Answering (QA) system 800 includes a QA system Application Programming Interface (API) 802 and QA system log API 807. QA system API 802 provides an interface for submitting questions and receiving answers. QA system log API 807 provides an interface for obtaining log results.

Ground truth 801 is a human annotated data set of questions, corresponding answers, and an indication of whether the question is on-topic for the domain. QA system API 802 receives ground truth 801 in step 1A and sends questions from ground truth 801 to QA system 800 in step 1B. Then, in step 1C, the QA system 800 returns results to QA system API 802. In step 1D, the QA system API 802 then provides each question and the corresponding answer(s), each having an associated confidence score, to form ground truth (GT) run results 803.

Thereafter, evaluation API 804 receives the ground truth 801 and the GT run results 803 in step 2A. Evaluation API 804 compares the ground truth 801 with the GT run results 803 to determine whether QA system 800 got the answer to the question right. Evaluation API 804 then provides QA system performance results to generate intrinsic focus ground truth measurements 806. In one illustrative embodiment, evaluation API 804 uses comparator 805 to perform a fuzzy matching algorithm for deterministic matching of ground truth answers with GT run results answers, as will be described in further detail below.

In step 3A, QA system log API 807 accesses QA system 800 to collect QA system results and, in step 3B, generates QA system log results 808. Question matching API 809 receives ground truth 801 and QA system log results 808 in step 4A. Question matching API 809 compares questions in QA system log results 808 with questions in ground truth 801. Question matching API 809 finds a closest question in ground truth 801 matching each question in QA system log results 808. In one embodiment, if QA matching API 809 does not find a matching question in ground truth 801 for a given question in log results 808, then QA matching API 809 will indicate no match was found and present that question to a human annotator to verify correctness.

In one illustrative embodiment, question matching API 809 uses comparator 810 to perform a fuzzy matching algorithm for deterministic matching of ground truth questions with QA system log results questions, as will be described in further detail below. In one embodiment, in step 4B, a human operator 811 vets the auto-matched questions, and question matching API 809 provides the matched QA system log results to evaluation API 812.

Thereafter, evaluation API 812 receives the ground truth 801 and the matched QA system log results in step 4C. Evaluation API 812 compares the ground truth 801 with the matched QA system log results to determine whether QA system 800 got the answer to the question right. Evaluation API 812 then provides QA system performance results to generate extrinsic focus field measurements 814. In one illustrative embodiment, evaluation API 812 uses comparator 813 to perform a fuzzy matching algorithm for deterministic matching of ground truth answers with QA system log results answers, as will be described in further detail below.

The performance assessment system of the illustrative embodiments may present ground truth measurements 806 or field measurements 814 in a graphical format, such as the threshold control panel illustrated in FIG. 5.

To determine whether an answer given by QA system 800 is right or wrong, comparators 805, 810, 813 compare the given answer against the ground truth answer. Simple comparisons (e.g., database lookups, programmatic equality, string matching, etc.) are not effective at determining answer (or question) matches. Thus, in one illustrative embodiment, comparators 805, 810, 813 use a fuzzy matching algorithm to find the degree of overlap between two questions or two questions. Specifically, comparator 805, 810, 813 computes the ratio of how much answer 2 "contains" answer 1. The output is in the range [0, 1]. Output of 1 indicates complete overlap, exact match. Output of 0 indicates zero overlap, completely different answers (or questions in the case of comparator 810) on a syntax level.

Comparators 805, 810, 813 use an asymmetric, fuzzy, deterministic matching to calculate the containment between text A and text B as follows:

$$C = [Tr(A) \text{ intersect } Tr(B)]/Tr(B),$$

where C is the degree to which B is contained within A and Tr(.) is the set of all overlapping trigrams in A or B. A trigram is an ordered list of three words that occur in the specified text. For example, the text, "The cat on the mat," has five words and three trigrams, namely, "The cat on," "cat on the," and "on the mat."

For any vocabulary V, there are |V| many words and |V|$^3$ possible trigrams. This means that even a modest amount of words, such as 100 unique words in a QA system answer, can have a million trigrams. This means that the set of all trigrams offer a unique fingerprint for any text that is effectively impossible to overlap with accidentally. For example, the text, "The cat on the mat," has three trigrams; thus, the chance of a random five-word sentence accidentally matching it is one million trillion, even for small vocabularies.

Comparators 805, 810, 813 determine whether the QA system answer, SA, contains the entire ground truth answer, GA, as follows:

$$C1 = \text{Containment}(GA \text{ in } SA) = [Tr(SA) \text{ intersect } Tr(GA)]/Tr(GA),$$

where Tr(SA) is the QA system answer's set of trigrams and Tr(GA) is the ground truth answer's set of trigrams. The result is a number in the range [0, 1] that indicates how much of the ground truth answer is present in the QA system answer. Comparators 805, 810, 813 also determine whether the ground truth answer, GA, contains the QA system answer, SA, as follows:

$$C2 = \text{Containment}(SA \text{ in } GA) = [Tr(GA) \text{ intersect } Tr(SA)]/Tr(SA),$$

where Tr(SA) is the QA system answer's set of trigrams and Tr(GA) is the ground truth answer's set of trigrams. The result is a number in the range [0, 1] that indicates how much of the QA system answer is present in the ground truth answer.

It should be clear that comparator 810 operates identically for questions rather than answers.

Comparators 805, 810, 812 provide two measures of the quality and equivalence rating of QA system output versus ground truth or how well a user's question matches a question in the ground truth. Question matching API 809 matches QA system log results questions to ground truth questions based on these two measures. Similarly, evaluation API 804 compares GT run results answers against ground truth answers based on these two measures, and evaluation API 812 compares QA system log results answers against ground truth answers based these two measures.

Such a comparator performs extremely fast calculation without a need to use external ontologies or lookups. These comparators are more resilient to vocabulary changes, sentence order changes, and especially format changes than string/substring comparison or bag of words models. Comparators 805, 810, 813 have asymmetric answer comparison, i.e., A1 contained in A2!=A2 contained in A1. This is very useful in ensuring that 100% of the ground truth answer (or question) is contained in the system answer (or question), or figuring out if 100% of the system answer (or question) is contained in the ground truth answer (or question). Furthermore, no training is required for the deterministic matching of the illustrative embodiment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 9:
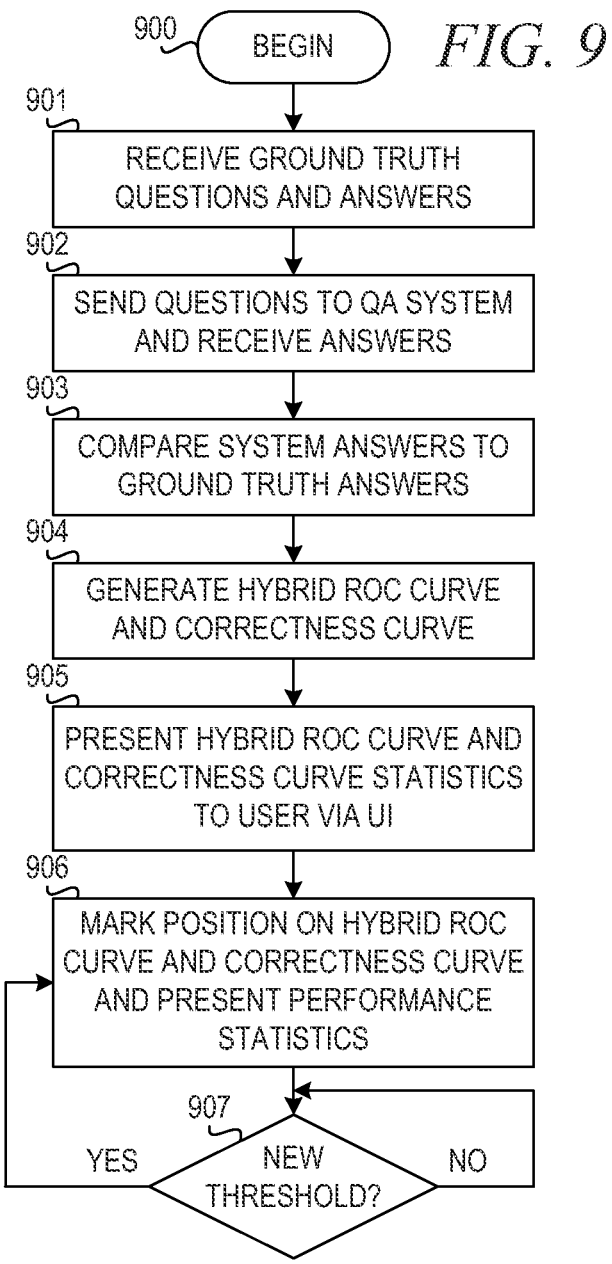
FIG. 9 is a flowchart illustrating operation of a system for assessing question answering system performance ground truth measurements across confidence thresholds in accordance with an illustrative embodiment.

FIG. 9 is a flowchart illustrating operation of a system for assessing question answering system performance ground truth measurements across confidence thresholds in accordance with an illustrative embodiment. Operation begins (block 900), and the system receives ground truth questions and answers (block 901). The system sends questions from the ground truth and receives answers with confidence values (block 902). The system compares the system answers with the ground truth answers (block 903).

Then, the system generates a hybrid ROC curve and a correctness curve using on-topic versus off-topic information for all possible confidence threshold values (block 904). The hybrid ROC curve plots the probability of a true answer (on-topic correct answer probability) versus the probability of a false answer (off-topic incorrect answer probability), taking into account the on-topic versus off-topic information. The correctness curve plots the on-topic precision versus the percentage of questions answered (on-topic attempted percentage). The system presents the hybrid ROC curve and the correctness curve to the user via a user interface (block 905). The system marks a position on the ROC curve and the correctness curve for a default confidence threshold value and presents corresponding system performance statistics (block 906).

The system then determines whether the user selects a confidence threshold value (block 907). If the user does not select a new confidence threshold value, then operation returns to block 907. If the user selects a new confidence threshold value in block 907, operation returns to block 906 to mark the position on the ROC curve and the correctness curve for the selected confidence threshold value and presents corresponding system performance statistics.

Figure 10:
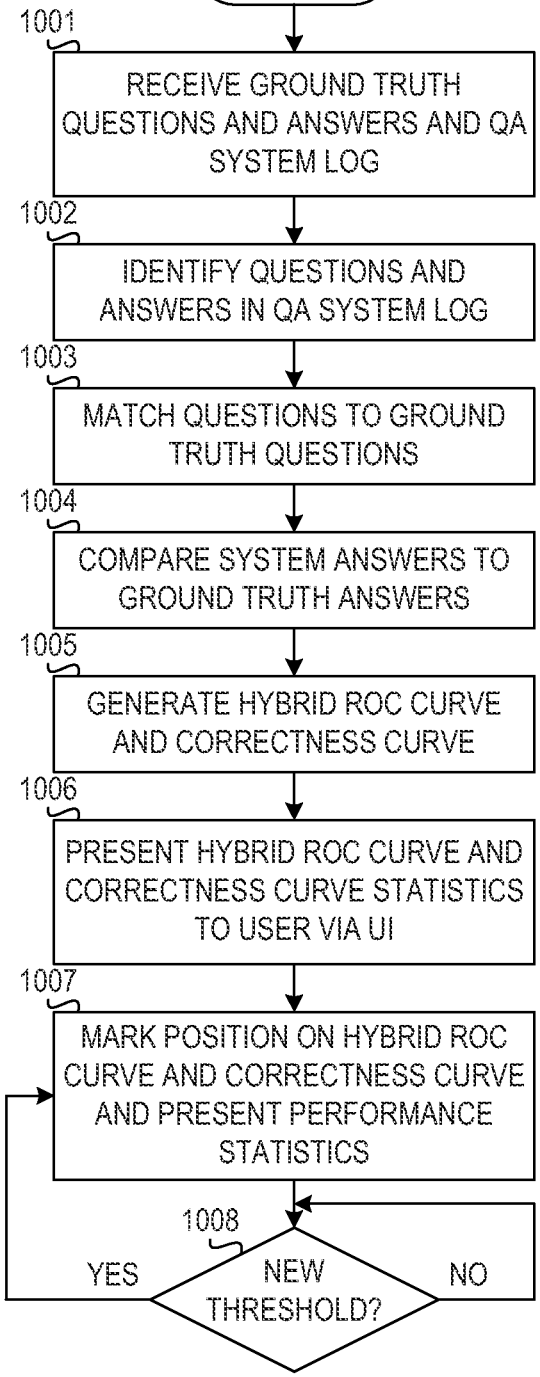
FIG. 10 is a flowchart illustrating operation of a system for assessing question answering system performance field measurements across confidence thresholds in accordance with an illustrative embodiment.

FIG. 10 is a flowchart illustrating operation of a system for assessing question answering system performance field measurements across confidence thresholds in accordance with an illustrative embodiment. Operation begins (block 1000), and the system receives ground truth questions and answers and a QA system results log (block 1001). The system identifies questions and answers in the QA system results log (block 1002). The system matches questions from the results log to ground truth questions (block 1003) and compares the system answers with the ground truth answers (block 1004).

Then, the system generates a hybrid ROC curve and a correctness curve using on-topic versus off-topic information for all possible confidence threshold values (block 1005). The hybrid ROC curve plots the probability of a true answer (on-topic correct answer probability) versus the probability of a false answer (off-topic incorrect answer probability), taking into account the on-topic versus off-topic information. The correctness curve plots the on-topic precision versus the percentage of questions answered (on-topic attempted percentage). The system presents the hybrid ROC curve and the correctness curve to the user via a user interface (block 1006). The system marks a position on the ROC curve and the correctness curve for a default confidence threshold value and presents corresponding system performance statistics (block 1007).

The system then determines whether the user selects a confidence threshold value (block 1008). If the user does not select a new confidence threshold value, then operation returns to block 1008. If the user selects a new confidence threshold value in block 1008, operation returns to block 1007 to mark the position on the ROC curve and the correctness curve for the selected confidence threshold value and presents corresponding system performance statistics.

Figure 11:
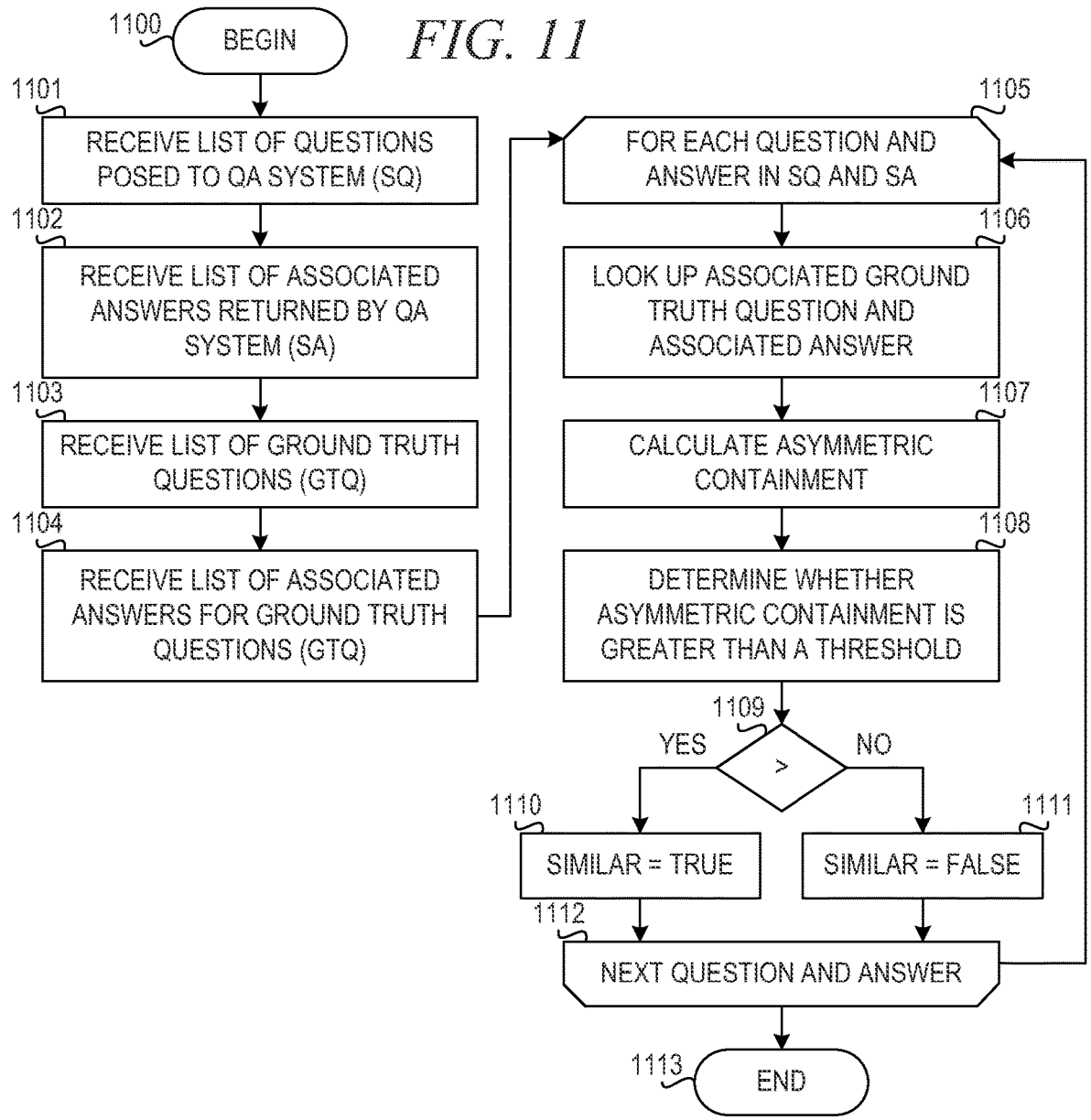
FIG. 11 is a flowchart illustrating operation of a comparator for determining similarity of system answer text to ground truth answer text in accordance with an illustrative embodiment.

FIG. 11 is a flowchart illustrating operation of a comparator for determining similarity of system answer text to ground truth answer text in accordance with an illustrative embodiment. Operation begins (block 1100), and the comparator receives a list of questions posed to the QA system (SQ) (block 1101). The comparator receives a list of associated answers returned by the QA system (SA) (block 1102). The comparator then receives a list of ground truth questions (GQ) (block 1103) and associated ground truth answers (GA) (block 1104).

For each question and answer in SQ and SA (block 1105), the comparator looks up the associated ground truth question and the associated ground truth answer (block 1106). The comparator then calculates asymmetric containment (block 1107) and compares the asymmetric containment values to a threshold (block 1108). The containment threshold is set by empirically measuring a subset of the data and selecting a point at which 95% of the human declared similarity agree with the automated comparator logic. Depending on where the comparator exists in the usage flow, the comparator may compare system questions against ground truth questions (e.g., comparator 810 in FIG. 8) or system answers against ground truth answers (e.g., comparators 805, 813 in FIG. 8). The comparator determines whether both asymmetric containment values are greater than the threshold (block 1109). If both containment values are greater than the threshold, the comparator returns a true result (block 1110); otherwise, the comparator returns a false result (block 1111). Thereafter, the comparator considers the next question and answer in SQ and SA (block 1112), and operation repeats blocks 1105-1111. If the last question and answer have been processed in block 1112, then operation ends (block 1113).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system having a processor and a memory, wherein the memory comprises instructions which are executed by the processor to cause the processor to implement a performance assessment system for assessing question answering system performance, the method comprising:

receiving, by the performance assessment system, question answering system results, wherein the question answering system results comprise questions posed to the question answering system, answers returned by the question answering system for each question posed to the question answering system, and a confidence value for each answer, and wherein the question answering system is trained or tested using the ground truth questions and answers;

performing, by a data manipulation and calculation component executing within the performance assessment system, a matching operation comparing each question in the question answering system results to questions in the ground truth, wherein a given question is determined to be on-topic or off-topic based on results of the matching operation;

for a plurality of confidence threshold values for an answer confidence threshold, determining, by the data manipulation and calculation component, a rightness or wrongness s of each answer in the question answering system results;

generating, by the performance assessment system, performance statistics for the plurality of confidence threshold values based on whether each question is on-topic or off-topic and whether each answer is right or wrong based on the plurality of confidence threshold values for the answer confidence threshold;

generating, by a web interface component executing within the performance assessment system, a threshold control panel graphical user interface (GUI) comprising a current threshold control for setting a current answer confidence threshold value;

presenting, by the web interface component, the threshold control panel GUI to a user;

responsive to the user interacting with the current answer confidence control to set the current answer confidence threshold value, presenting, by the web interface component, the performance statistics to the user via a user interface, wherein the performance statistics comprise an on-topic correct answer probability value and an off-topic incorrect answer probability value corresponding to the current answer confidence threshold value; and configuring the question answering system with the current answer confidence threshold value.

2. The method of claim 1, wherein receiving question answering system results comprises submitting each question from the ground truth questions and answers to the question answering system and receiving a response answer from the question answering system for each submitted question and a confidence value associated with each response answer.

3. The method of claim 1, wherein receiving question answering system results comprises receiving question answering system log results via a question answering system log application programming interface.

4. The method of claim 1, wherein determining a rightness or wrongness of each answer in the question answering system results comprises performing a matching operation comparing each given answer in the question answering system results to a corresponding ground truth answer.

5. The method of claim 1, wherein the performance statistics further comprise a hybrid Receiver Operating Characteristics (ROC) curve that plots probability of a true answer versus probability of a false answer for the plurality of confidence threshold values.

6. The method of claim 5, wherein presenting the performance statistics comprises:
presenting the hybrid ROC curve; and
marking a location on the hybrid ROC curve corresponding to the current answer confidence threshold value.

7. The method of claim 1, wherein the performance statistics further comprise a correctness curve that plots precision versus questions answered for the plurality of confidence threshold values.

8. The method of claim 7, wherein presenting the performance statistics comprises:
presenting the correctness curve; and
marking a location on the correctness curve corresponding to the current answer confidence threshold value.

9. The method of claim 1, wherein the performance statistics further comprise an on-topic precision value and an on-topic attempted percentage value corresponding to the current answer confidence threshold value.

10. A computer program product comprising a computer readable storage medium having a computer readable program stored therein, wherein the computer readable program, when executed on a computing device, causes the computing device to implement a performance assessment system for assessing question answering system performance, wherein the computer readable program causes the computing device to:
receive, by the performance assessment system, question answering system results, wherein the question answering system results comprise questions posed to the question answering system, answers returned by the question answering system for each question posed to the question answering system, and a confidence value for each answer, and wherein the question answering system is trained or tested using the ground truth questions and answers;
perform, by a data manipulation and calculation component executing within the performance assessment system, a matching operation comparing each question in the question answering system results to questions in the ground truth, wherein a given question is determined to be on-topic or off-topic based on results of the matching operation;
for a plurality of confidence threshold values for an answer confidence threshold, determine, by the data manipulation and calculation component, a rightness or wrongness of each answer in the question answering system results;
generate, by the performance assessment system, performance statistics for the plurality of confidence threshold values based on whether each question is on-topic or off-topic and whether each answer is right or wrong based on the plurality of confidence threshold values for the answer confidence threshold;
generate, by a web interface component executing within the performance assessment system, a threshold control panel graphical user interface (GUI) comprising a current threshold control for setting a current answer confidence threshold value;
present, by the web interface component, the threshold control panel GUI to a user;
responsive to the user interacting with the current answer confidence control to set the current answer confidence threshold value, present, by the web interface component, the performance statistics to the user via a user interface, wherein the performance statistics comprise an off-topic incorrect answer probability value corresponding to the current answer confidence threshold value; and
configure the question answering system with the current answer confidence threshold value.

11. The computer program product of claim 10, wherein receiving question answering system results comprises submitting each question from the ground truth questions and answers to the question answering system and receiving a response answer from the question answering system for each submitted question and a confidence value associated with each response answer.

12. The computer program product of claim 10, wherein receiving question answering system results comprises receiving question answering system log results via a question answering system log application programming interface.

13. The computer program product of claim 10, wherein determining a rightness or wrongness of each answer in the question answering system results comprises performing a matching operation comparing each given answer in the question answering system results to a corresponding ground truth answer.

14. The computer program product of claim 10, wherein the performance statistics further comprise a hybrid Receiver Operating Characteristics (ROC) curve that plots probability of a true answer versus probability of a false answer for the plurality of confidence threshold values.

15. The computer program product of claim 14, wherein presenting the performance statistics comprises:
presenting the hybrid ROC curve; and
marking a location on the hybrid ROC curve corresponding to the current answer confidence threshold value.

16. The computer program product of claim 10, wherein the performance statistics further comprise a correctness curve that plots precision versus questions answered for the plurality of confidence threshold values.

17. The computer program product of claim 16, wherein presenting the performance statistics comprises:
presenting the correctness curve; and
marking a location on the correctness curve corresponding to the current answer confidence threshold value.

18. The computer program product of claim 10, wherein the performance statistics further comprise an on-topic precision value and an on-topic attempted percentage value corresponding to the current answer confidence threshold value.

19. An apparatus comprising:
a processor; and
a memory coupled to the processor, wherein the memory comprises instructions which, when executed by the processor, cause the processor to implement a performance assessment system for assessing question answering system performance, wherein the instructions further cause the processor to:
receive, by the performance assessment system, question answering system results, wherein the question answering system results comprise questions posed to the question answering system, answers returned by the question answering system for each question posed to the question answering system, and a confidence value for each answer, and wherein the question answering system is trained or tested using the ground truth questions and answers;

perform, by a data manipulation and calculation component executing within the performance assessment system, a matching operation comparing each question in the question answering system results to questions in the ground truth, wherein a given question is determined to be on-topic or off-topic based on results of the matching operation;

for a plurality of confidence threshold values for an answer confidence threshold, determine, by the data manipulation and calculation component, a rightness or wrongness of each answer in the question answering system results;

generate, by the performance assessment system, performance statistics for the plurality of confidence threshold values based on whether each question is on-topic or off-topic and whether each answer is right or wrong based on the plurality of confidence threshold values for the answer confidence, threshold;

generate, by a web interface component executing within the performance assessment system, a threshold control panel graphical user interface (GUI) comprising a current threshold control for setting a current answer confidence threshold value;

present, by the web interface component, the threshold control panel GUI to a user;

responsive to the user interacting with the current answer confidence control to set the current answer confidence threshold value, present, by the web interface component, the performance statistics to the user via a user interface, wherein the performance statistics comprise an off-topic incorrect answer probability value corresponding to the current answer confidence threshold value; and configure the question answering system with the current answer confidence threshold value.

20. The apparatus of claim 19, wherein determining a rightness or wrongness of each answer in the question answering system results comprises performing a matching operation comparing each given answer in the question answering system results to a corresponding ground truth answer.

21. The apparatus of claim 19, wherein the performance statistics further comprise an on-topic precision value and an on-topic attempted percentage value corresponding to the current answer confidence threshold value.

* * * * *